Oct. 16, 1923.

F. A. GRUBER 1,471,157

WHEEL

Original Filed May 19, 1919   3 Sheets-Sheet 1

INVENTOR
FRANK A. GRUBER.
Clarence S. Walker.
ATTORNEY.

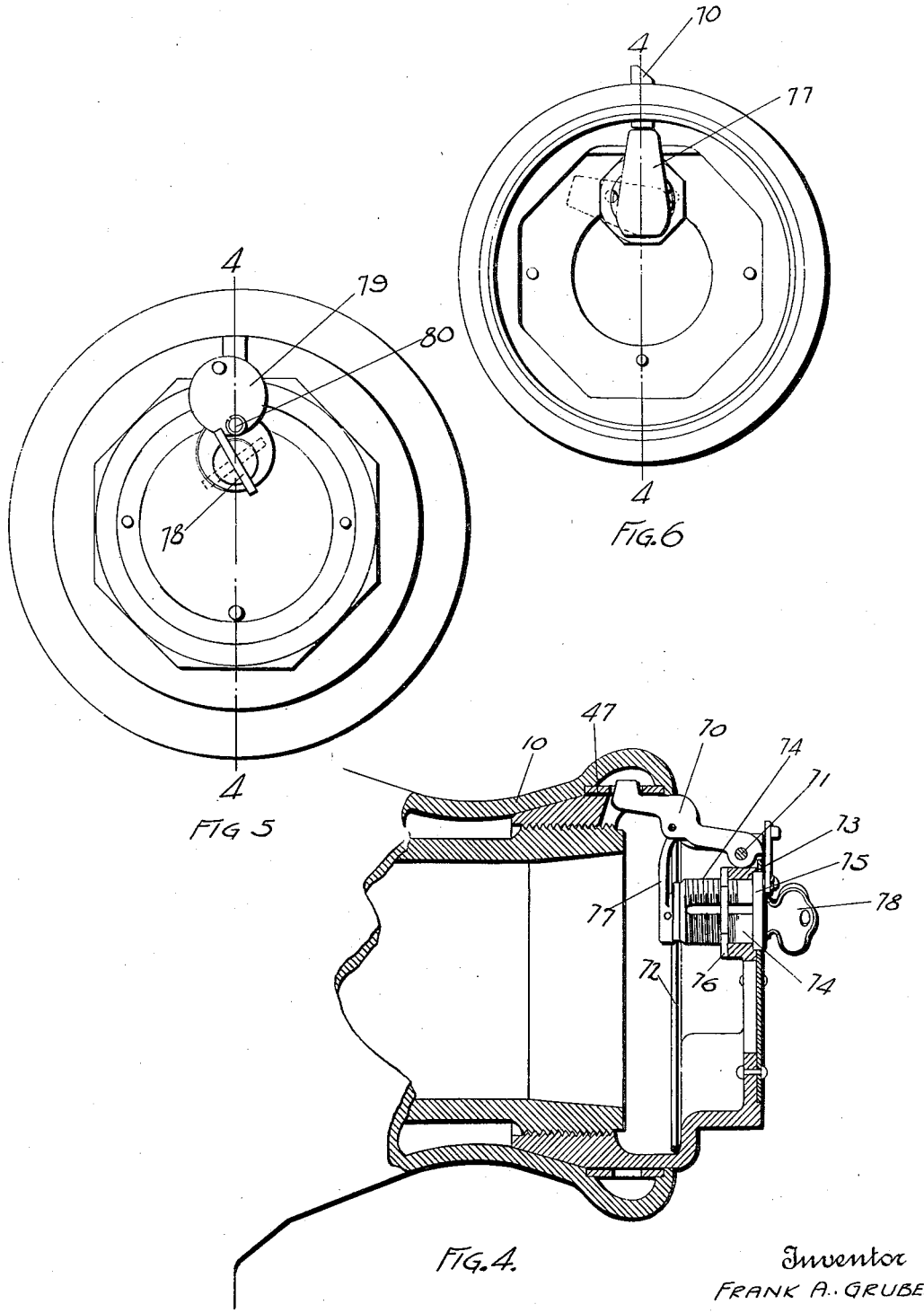

Oct. 16, 1923.

F. A. GRUBER

WHEEL

Original Filed May 19, 1919     3 Sheets-Sheet 3

1,471,157

INVENTOR.
FRANK A. GRUBER.

ATTORNEY.

Patented Oct. 16, 1923.

1,471,157

UNITED STATES PATENT OFFICE.

FRANK A. GRUBER, OF BUFFALO, NEW YORK, ASSIGNOR TO WIRE WHEEL CORPORATION OF AMERICA, OF BUFFALO, NEW YORK, A CORPORATION OF NEW YORK.

WHEEL.

Substitute for application Serial No. 298,168, filed May 19, 1919. This application filed December 20, 1920. Serial No. 431,920½.

*To all whom it may concern:*

Be it known that I, FRANK A. GRUBER, a citizen of the United States, and resident of Buffalo, Erie County, State of New York, have invented certain new and useful Improvements in Wheels, of which the following is a specification.

This invention relates to improvements in wheel equipment and particularly to improvements in spare wheel carriers and locking means therefor.

Means by which a single spare wheel carrier can be adapted to support two spare wheels are disclosed in the patent to Very 1,249,564. The means there shown has no means for preventing rotation of the wheels upon the carrier and has no locking mechanism for holding the extension spindle, generally known in the trade as an adapter, on to the fixed spindle or dummy hub. It has happened that the jolts of a moving automobile provided with such an adapter have resulted in the unscrewing of the adapter and the loss of both wheels and adapter. Moreover, it is possible for the outer wheel and adapter to be taken off and carried away by a thief together with the inner wheel.

One object of this invention is to provide means for preventing rotation of the wheels upon the adapter and dummy hub.

Another object of this invention is to provide means for locking the adapter to the dummy hub.

Another object is to arrange such a locking means so that they are controlled either by the outer wheel or by means independent thereof.

A further object is to provide key operated hub cap lock by which the outer wheel, the adapter and the inner wheel are secured against any unauthorized or accidental removal.

Further objects of this invention will appear from a consideration of the description thereof in the specification and of the drawing annexed thereto and forming a part thereof, in which drawing, Fig. 1 shows a sectional view of one embodiment of this invention.

Fig. 4 is a sectional view of Figs. 5 and 6 taken on line 4—4, of the hub cap and locking means for the outer wheel.

Fig. 5 is an end view of the outer wheel and hub cap.

Fig. 6 is a bottom view of the hub cap showing the locking plate in operative and inoperative position.

Figure 1:
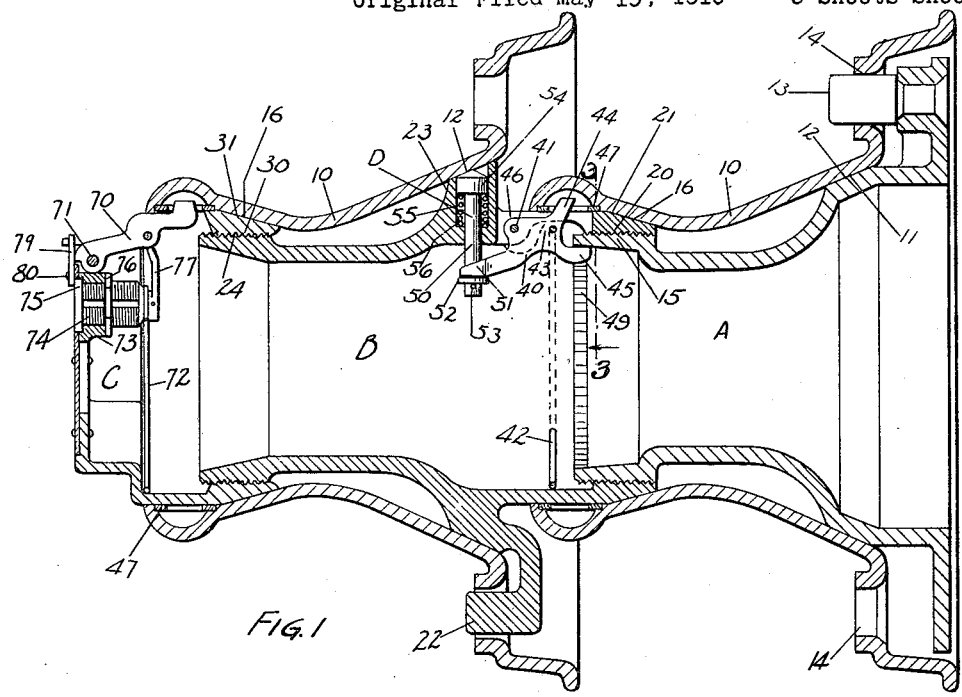
Figure 2:
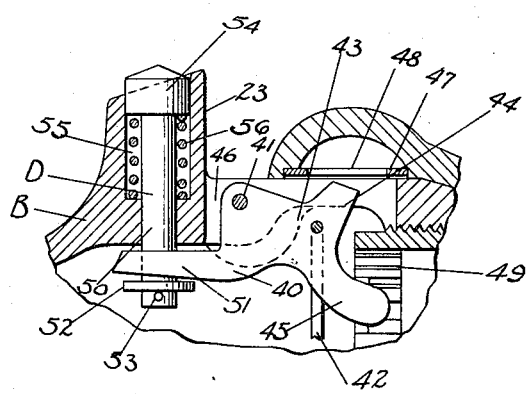
Fig. 2 is an enlarged view of the adapter in inoperative position.
Figure 7:
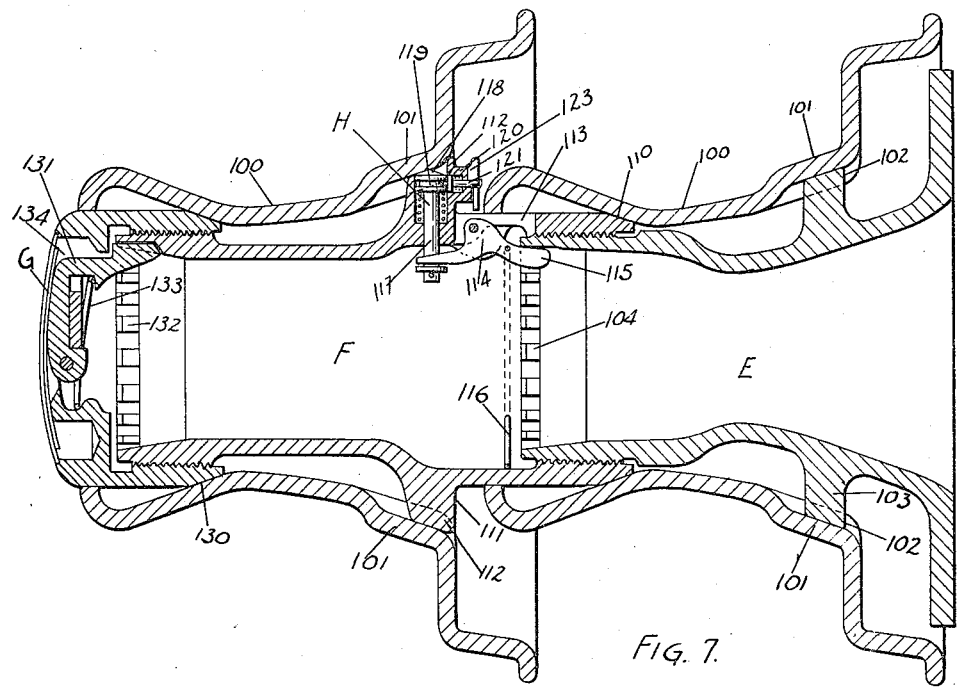
Fig. 7 is a section similar to Fig. 1 showing another embodiment of this invention.

Referring to the drawings the carrier when arranged to carry two wheels as shown in Figs. 1 and 7 comprises the dummy hub A, the adapter B, and the hub cap C. For convenience in illustration only the hub shells of the wire wheels 10 are shown.

The dummy hub A has a conical portion 11, on which rests the internally coned portion 12 of the wheel 10, and one or more projecting pins 13 which when the wheel is slipped onto the dummy hub enter the driving lug apertures 14 of the wheel and prevent its rotation. It is of course understood that the dummy hub is rigidly secured to the motor vehicle by any suitable means.

The adapter B has an internally threaded portion 20 which engages the externally threaded outer end 15 of the dummy hub. At its inner end the adapter is cone shaped as at 21 to engage the conical surface 16 at the outer portion of the wheel. The inner end of the adapter corresponds to the inner end of the hub cap C and holds the wheel as firmly onto the dummy hub as the hub cap would if no adapter were used and the hub cap were secured to the dummy hub as set forth in the Very patent referred to above.

Mounted on the adapter and customarily, as shown in the drawing, integral therewith, is a pin 22 which corresponds in shape and function to the pins 13 on the dummy hub. The adapter has a conical annular flange 23 similar to the conical portion 11 of the dummy hub and at its outer end is externally threaded at 24 to receive the hub cap C.

The hub cap C is internally threaded as at 30 to engage the threaded end of the adapter and has a conical portion 31. When the outer wheel is slipped onto the adapter B the pin 22 enters one of the apertures 14 the conical portion 23 supports the inner end of the wheel by engagement with the coned portion 12 of the wheel. The hub cap is now threaded into place, its conical portion 31 supporting the wheel at its conical surface 16.

As described above the dummy hub A, adapter B and the hub cap C co-operate to position two wheels and hold them against rotative or longitudinal movement.

A locking device D is provided to prevent any unscrewing of the adapter from the dummy hub. This device is held in operative position by the wheel on the adapter.

The locking end 43 of the bar 40 is forked one part 44 engaging the wheel on the dummy hub and the other part 45 engaging the dummy hub itself. The part 44 passes through a longitudinal slot 46 in the adapter and engages the locking ring 47 of the wheel. The locking ring 47 of the wheel, is secured at the outer end of the wheel and is provided with an annular series of openings 48 with any one of which the part 44 engages. Since the wheel 10 is held against rotation on the dummy hub by the pin, or pins 13 the adapter will through the lock, be held in position. The part 45 of the lock bar enters the open end of the dummy hub A and engages one of the teeth 49 in such end. The adapter therefor is held against rotation on the hub by two locking means. Should it be deemed advisable a lock bar 40 having only one of these locking means could be employed, either being sufficient in itself to hold the adapter in place.

When the locking bar is in its normal position it will of course be impossible to screw the adapter into place. Means are therefore provided to counteract the spring 42. As shown in the drawings these means comprise a spring actuated plunger 50 which extends radially through the adpater, at the flange 23. Then so that the plunger may pass between the forks 51, a washer 52 on the plunger, held in place by a pin 53, normally bears against the forked end of the bar and holds the end 43 out of engagement with the ring 47 and hub teeth 49.

At the upper end of the plunger 50 is an enlarged head 54, the opening 55 being correspondingly enlarged. A spring 56 around the plunger bearing against the enlarged head 54 and the bottom of the enlarged opening 55 tends to raise the plunger and thus to depress the end 43 of the locking bar. The top of the head 54 is cone shaped having the same inclination as the conical flange 23 of the adapter.

When the wheel is shipped over the adapter it bears against the cone shaped top of the plunger and depresses it against the action of the spring 56 into the position shown in Fig. 1. The locking bar 40 being free to respond to the urge of the spring 42 rocks about the pivot 41 and the end 43 engages the ring 47 and the teeth 49.

In addition to the locking device above described a key operated locking device is provided on the hub cap. A locking bar 70 pivoted at 71 on the hub cap is normally urged by the spring 72 into engagement with the locking ring 47 of the wheel 10. This construction is disclosed in the patent to House 1,166130.

Projecting on the inner side of the hub cap is a boss 73 through which the casting 74 of the key operated lock extends, being held in place by a flange 75 and a nut 76 threaded onto the casing. Details of the key operated lock are not shown because they have no bearing on the invention. The arm 77 on the lock is swung by turning the key 78 into contact with the bar 70 and thus holds the bar rigidly in locking position. A cover 79 pivoted at 80 covers the lock when the key is withdrawn.

Figure 8:
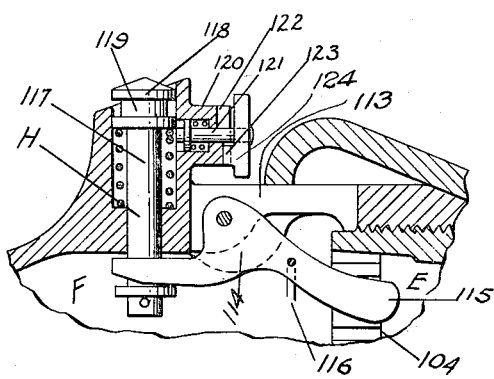
Fig. 8 is an enlarged detail view of a part thereof.

The embodiment shown in Figs. 7 and 8 is adapted to carry wheels of a different type from those carried by the embodiment first described. The chief difference in the wheels consists in the form of drive which necessitates a change in the carrier formation as will be pointed out below.

The carrier comprises the dummy hub E, fastened to the vehicle not shown, the adapter F and the hub cap G which are assembled and co-act in the same way as the parts A, B, C of Fig. 1. In place of the apertures 14 the wheel hub shell 100 has an annular series of corrugations 101 with which projection 102 on the flange 103 of the dummy hub engage, to prevent rotation.

The inner end of the adapter F is threaded onto the dummy hub and is coned as at 110 to engage and support the wheel on the dummy hub. The adapter has an annular flange 111 having one or more projections 112 which engage the corrugations 101 of the wheel 100 carried by the adapter and prevents its rotation relative thereto.

Figure 3:
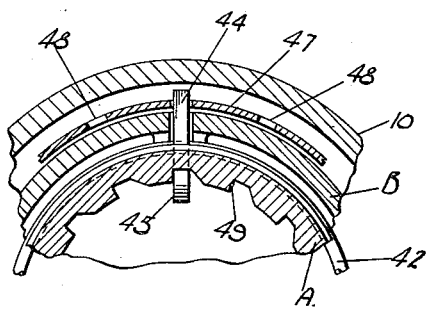
Fig. 3 is a section taken on the line 3—3 of Fig. 1.

The outer end of the dummy hub E has an internal series of teeth 104 similar to the teeth 49 shown in Figs. 1 and 3 and with them a locking device H carried by the adapter engages to hold the latter in place.

The locking device H corresponds in part to the locking device D. Pivoted in a slot 113 in the adapter F is a locking bar 114 the end 115 of which engages the teeth 104 of the dummy hub. A spring 116 holds the bar 114 in operative position. A spring controlled plunger 117 similar in construction to the plunger 50 normally withdraws the locking end of the bar against the action of the spring 116 so that the parts assume the position shown in Fig. 8.

The head 118 of the plunger 117 is cone shaped and when the wheel is slipped onto the adapter the plunger 117 is depressed and the spring 116 is allowed to urge the bar 114 into locking engagement with the teeth 104. This construction and operation is so close to those already described in detail with reference to the locking device D on Fig. 1 that a more complete description of this part of the locking device is believed to be unnecessary.

It may be desirable to retain the adapter upon the dummy hub although no wheel is carried thereby. The locking device as so far described however, depends upon the adapter supported wheel for its actuation so that additional means should be employed to insure the locking of the adapter in place and the resultant securing of the wheel carried by the dummy hub. Through a boss 120 on the rear of the flange 111 extends a spring pressed plunger 121. The head 118 of the plunger 117 is provided with an annular groove 119 into which the end of the plunger 121 enters as shown in Fig. 7. When the plunger 121 is impelled by the spring to engage the head 118 the plunger 117 is rigidly held in the inoperative position shown in Fig. 7 and the locking bar 114 is yieldingly held in operative position by the spring 116.

In order to hold the plunger 121 in the desired position a transverse slot 122 is provided in the end of the boss 120 into which enters a projection 123 on the under side of the plate 124 which is fastened to the plunger 121. The slot 122 is deeper above the plunger as shown in Fig. 8 than below. When the projection 123 is in the deeper position of the slot (see Fig. 7) the plunger 121 extends into the groove 119 and holds the plunger 117 depressed. When, however, the projection is in the shallower portion (see Fig. 8) the plunger 121 is retracted from engagement with the plunger 117. In changing the projection from one position to the other the plunger 121 is withdrawn until the projection 123 is entirely free from the slot 122, then rotated 180 degrees and allowed to move into normal position the projection 123 again entering the slot.

On the outer end of the adapter F is mounted the hub cap G which has a coned inner end 130 which engages and supports the outer end of the wheel 100 carried by the adapter. A transversely reciprocating locking bar 131 carried by the hub cap engages the teeth 132 on the end of the adapter F to hold the cap in place. The bar 131 is forced into locking position by a spring 133 and is withdrawn by a pin or plug introduced through the hole 134 in the cap.

While one embodiment is described as having a key operated hub cap lock and the other embodiment as having a supplementary lock for the locking device H it is obvious that these locks could be used on either embodiment. In order to avoid unnecessary duplications of showings in the drawings the locks are not shown applied to each embodiment.

While two embodiments only are shown and described, it will be understood that applicant is not limited thereto, except in so far as is set forth in the annexed claims.

I claim:

1. In a device of the character described the combination of a dummy hub, on which a spare wheel is mounted, an adapter for holding said wheel in place and on which a second wheel is mounted, a hub cap for holding said second wheel in position and means controlled by said second wheel for locking said adapter in place on said dummy hub.

2. In a device of the character described the combination of a dummy hub on which a spare wheel is mounted, an adapter for holding said wheel in place and on which a second wheel is mounted, a hub cap for holding said second wheel in position, means operated by said second wheel for locking said adapter in place on said dummy hub and means independent of said second wheel for permitting said locking means to operate.

3. In a device of the character described the combination of a dummy hub, a spare wheel mounted thereon, co-acting means on said hub and wheel to prevent relative rotation, an adapter screw threaded onto said hub to hold said wheel in position and means carried by said adapter and engaging said wheel to lock said adapter onto said hub.

4. In a device of the class described the combination of a dummy hub, an adapted threaded onto said hub, a normally operative locking bar and a spring actuated plunger normally preventing the operation of said locking bar, said plunger being retracted by a spare wheel when slipped into place on said adapter so that the locking bar is permitted to operate.

5. A lock for a wheel carrier comprising a spring pressed normally operative locking bar, a spring actuated plunger normally preventing the operation of said locking bar and a second spring actuated plunger normally bearing against said first named plunger and holding it inoperative whereby the locking bar is permitted to operate.

6. In a device of the character described the combination of a dummy hub, an adapter threaded onto said dummy hub, a hub cap threaded onto said adapter and means pivoted upon said adapter and engaging said dummy hub for locking said adapter to said dummy hub.

7. In a device of the class described the combination of a dummy hub, an adapter threaded onto said dummy hub, a hub cap threaded onto said adapter, means pivoted upon said adapter and engaging said dummy hub for locking said adapter to said dummy hub and means carried by said hub cap and engaging said adapter for locking said hub cap to said adapter.

8. In a device of the class described the combination of a dummy hub, an adapter threaded onto said dummy hub, wheels carried by said adapter and hub cap, a device carried by said adapter for locking it to said dummy hub and to the wheel thereby and means actuated by the wheel on said adapter controlling the operation of said locking device.

In testimony whereof I affix my signature.

FRANK A. GRUBER.